United States Patent
Rakoczy et al.

(10) Patent No.: US 8,689,622 B2
(45) Date of Patent: Apr. 8, 2014

(54) SYSTEM FOR DETECTION OF TURBULENT AIR FLOW ACROSS A SAIL OF A SAILBOAT

(75) Inventors: Steve Rakoczy, Perth (AU); Steven Thomas McGuinness, Perth (AU)

(73) Assignee: Almos Technologies Pty. Ltd., Fremantle (AU)

( * ) Notice: Subject to any disclaimer, the term of this patent is extended or adjusted under 35 U.S.C. 154(b) by 88 days.

(21) Appl. No.: 13/583,579

(22) PCT Filed: Mar. 9, 2011

(86) PCT No.: PCT/EP2011/053553
§ 371 (c)(1),
(2), (4) Date: Sep. 7, 2012

(87) PCT Pub. No.: WO2011/110602
PCT Pub. Date: Sep. 15, 2011

(65) Prior Publication Data
US 2013/0036813 A1    Feb. 14, 2013

(30) Foreign Application Priority Data
Mar. 10, 2010  (EP) ..................................... 10156086

(51) Int. Cl.
*G01P 13/00*    (2006.01)
(52) U.S. Cl.
USPC ...................................................... 73/170.03
(58) Field of Classification Search
None
See application file for complete search history.

(56) References Cited

U.S. PATENT DOCUMENTS

| | | | | |
|---|---|---|---|---|
| 3,604,258 A | * | 9/1971 | Maiershofer | 73/170.34 |
| 4,270,191 A | * | 5/1981 | Peynaud | 367/91 |
| 4,571,984 A | * | 2/1986 | Malcosky | 73/19.03 |
| 5,877,415 A | | 3/1999 | Kruse | |
| 2007/0089658 A1 | | 4/2007 | Witte | |

FOREIGN PATENT DOCUMENTS

| | | |
|---|---|---|
| DE | 202008013535 | 3/2009 |
| EP | 2120053 | 11/2009 |

* cited by examiner

*Primary Examiner* — Lisa Caputo
*Assistant Examiner* — Jermaine Jenkins
(74) *Attorney, Agent, or Firm* — Marcus C. Dawes; Daniel L. Dawes

(57) ABSTRACT

A system for detection of turbulent air flow across a sail of a sailboat, comprising at least one base module arranged to be attached to said sail; an elongate body arranged to move in said air flow, which is attached to said at least one base module at one end; a power source on said at least one base module; at least one sensor on said at least one base module arranged to detect movement of said elongate body; and a signalling device arranged to output signals to a sailor on said sailboat in response to signals received from said at least one sensor; wherein said base module comprises at least one radiator which is arranged to transmit electromagnetic or optical radiation in the direction of said elongate body moving in said air flow; and said at least one sensor on said base module is arranged to detect reflected radiation from said elongate body moving in said air flow.

14 Claims, 2 Drawing Sheets

SYSTEM FOR DETECTION OF TURBULENT AIR FLOW ACROSS A SAIL OF A SAILBOAT

The invention relates to a system for detection of turbulent air flow across a sail of a sailboat, comprising at least one base module arranged to be attached to said sail; an elongate body arranged to move in said air flow, which is attached to said at least one base module at one end; a power source on said at least one base module; at least one sensor on said at least one base module arranged to detect movement of said elongate body; and a signalling device arranged to output signals to a sailor on said sailboat in response to signals received from said at least one sensor.

Such a system is described in U.S. Pat. No. 5,877,415. The system preferably comprises a multitude of base modules to be attached to a sail, such that turbulence along the entire height of a sail can be detected. Preferably said elongate body is a string or a flexible thread, preferably a wool thread.

Traditionally sailors simply watch wool threads ("tell tales"), which are attached near the front edge of a sail to detect turbulence across the sail. Ideally the air flow across the sail is laminar, in which case the wool thread will fly substantially in a steady position. If the wool thread flutters up and down substantially, this is a sign that the sail is not properly trimmed. Various devices are developed that try to take away the burden of the sailor to continuously check the sails for moving threads, such as the ones described in U.S. Pat. Nos. 5,877,415, 7,536,906, WO 2004/099790, WO 2009/066013 and EP 2 065 711.

The invention provides a system for detection of turbulent air flow across a sail of a sailboat which is more accurate, more reliable, easier to use and/or cheaper than prior art systems. Some aspects of the invention are described below, and further aspects of the invention are described by way of an embodiment later.

Preferably the base module comprises at least one radiator which is arranged to transmit electromagnetic or optical radiation in the direction of said elongate body moving in said air flow; and said at least one sensor on said base module is arranged to detect reflected radiation from said elongate body moving in said air flow. Preferably the wavelength of said radiation is outside the range of the substantially received radiation of sunlight on the earth surface. Thereby the reflected signal can be easily and reliably detected. Said at least one base module preferably comprises a straight or curved array of pairs of said radiators and said sensors, said array being arranged such that said base module can be attached to a sail in such a manner that said array extends substantially vertically and said elongated body is attached to the base module in front of said array.

Some preferred features of the invention reduce the energy requirements and/or increase the reliability of the system. The system is preferably arranged to track which of the sensors last detected a reflected signal, and to switch off sensors that are not neighbours of said sensor or sensors. The signalling device preferably comprises a switch for communicating a signal to said wireless communication device on said base module for putting said base module in sleep mode, and said base module is arranged to receive said sleep mode signal and to turn into a state in reaction thereto wherein the base module is shortly fully powered with predetermined intervals, for instance 2 seconds, and wait for a signal to turn into a state wherein the base module is fully powered continuously. The power source can be a connector for a power cable or a battery, but preferably comprises solar cells, and may further comprise a rechargeable battery connected therewith. Said at least one radiator is preferably an infrared radiator, preferably an infrared LED, and said at least one sensor is an infrared sensor, preferably an infrared sensitive photodiode. Said at least one radiator is preferably a pulsating radiator.

Said at least one base module and said signalling device preferably each comprise wireless communication devices for communicating signals from said at least one sensor to said signalling device. Said wireless communication device on said at least one base module preferably comprises means for automatically obtaining a unique node address from said wireless communication device on said signalling device. Preferably the system is arranged such that when a base module is first switched on or taken out of a protective packaging (for instance aluminium foil), it will obtain a first node address out of a predetermined set of node addresses (for instance number 1, out of a set of number 1 to 50) from the wireless communication device on the signalling device, and each following base module which is switched on or taken out of its packaging will obtain the subsequent node address out of said predetermined set (for instance number 2, then 3 and so on). This makes it possible to communicate to the user the node address (or a representative thereof which he can easily remember, such as "jib top left") of the base module where a signal is received. The user can for instance write the number or the representative down on the base module and attach it on the appropriate location to the sail, such that he or she immediately knows where turbulence is detected.

Said signalling device is preferably arranged to output audio and/or visual signals, and preferably said signalling device comprises an LCD display. The system is preferably arranged to output audio and/or visual signals only when there is a predetermined change in the signal received from said sensor and/or with predetermined time intervals, for instance 20 seconds.

Preferably base modules are attached in pairs at the same location on the two sides of the sail, such that the system can evaluate turbulence on both sides. Preferably the signalling device is arranged to provide audio and/or visual indications to tighten or loosen the sail.

The backside of the base module is preferably provided with attaching means like Velcro™, or the base module is provided with holes such that it can be sewn against a sail. Alternatively the base module can be glued to a sail.

The invention will be exemplified below by means of an embodiment as shown in the drawings, wherein.

Figure 1:
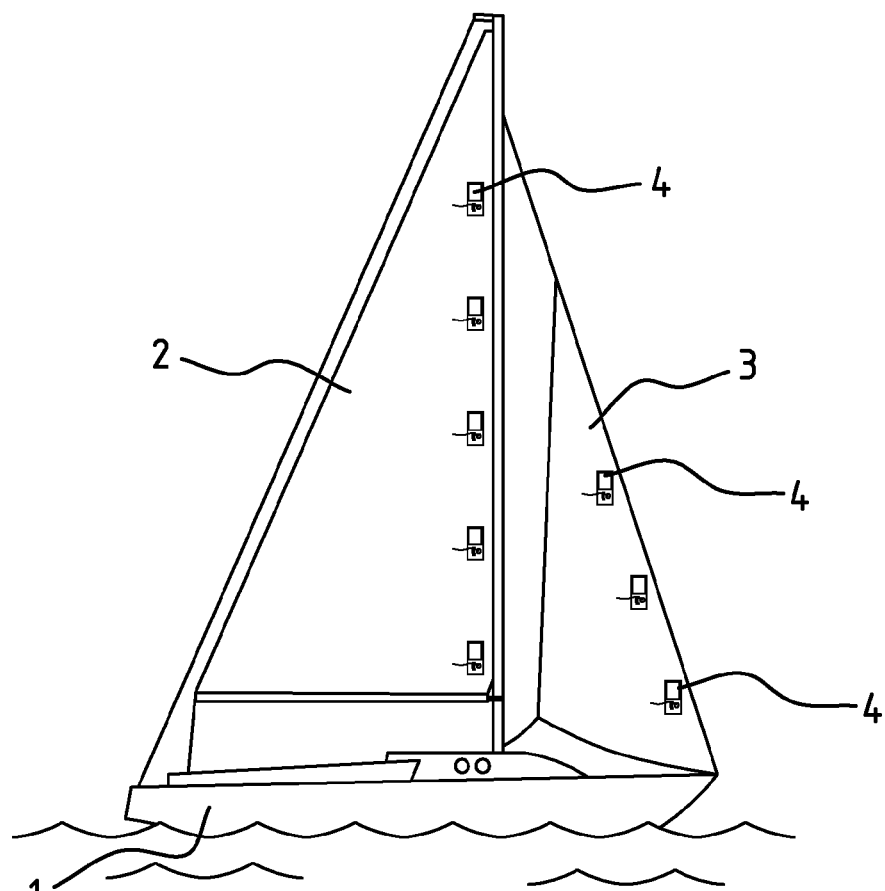
FIG. 1 shows a sailboat provided with a system for detection of turbulent air flow across the sails in accordance with the invention.
Figure 3:
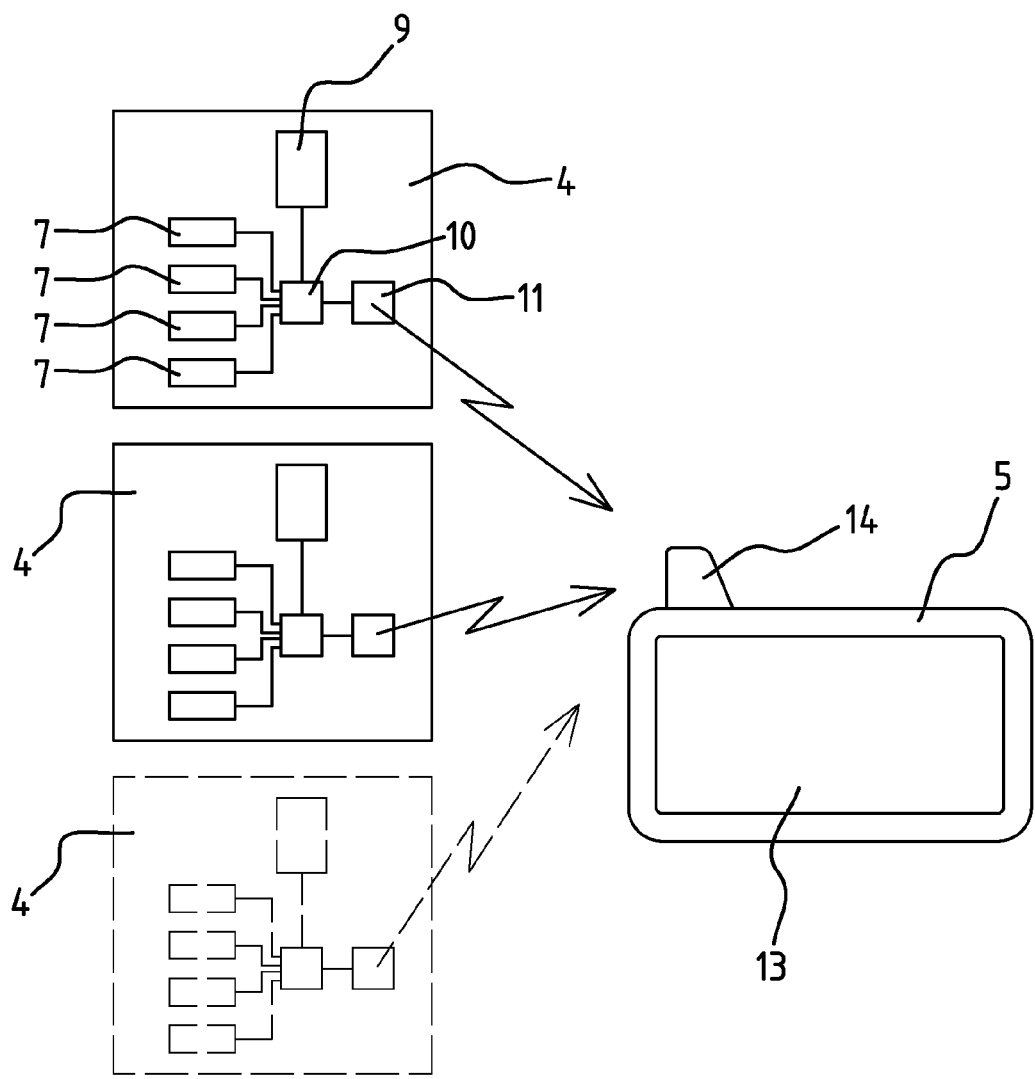
FIG. 3 is a schematic view of the system of FIG. 1.

In FIG. 1 a sailboat 1 is provided with a mainsail 2 and a headsail 3. The front edges of the sails 1, 3 are provided with base modules 4, for instance by means of Velcro™. The boat is further provided with a signalling device 5 (shown in FIG. 3) near the helm or steering wheel. The base modules 4 and the signalling device 5 can communicate wireless with each other, for instance with IEEE 802.11 standard equipment.

Figure 2:
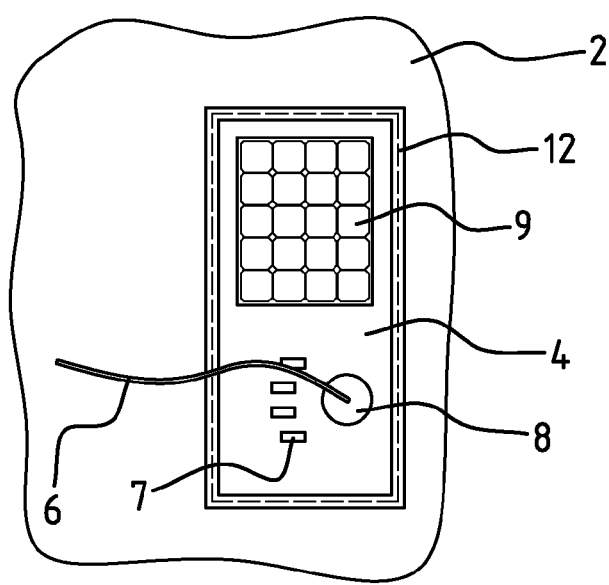
FIG. 2 shows one of the base modules of the system of FIG. 1.

According to FIG. 2, each base module 4 comprises a wool thread 6, which is attached with one of its outer ends to the front area (the right side area in the figure) of the base module, a curved array of four blocks 7 of infrared LEDs and infrared photocells arranged behind (left in the figure) the location 8 of the attachment of the wool thread. Further the base module 4 comprises a solar cell panel 9 for powering the base module, a sensor processor 10, and a wireless communication device 11 (shown in FIG. 3). The base module is for instance 80 mm tall, 40 mm wide and 8 mm thick. The sides 12 of the base module are sloping, in order to avoid wind turbulence.

The signalling device 5 comprises an LCD display 13, a speaker (not shown), a processor (not shown), a power source, for instance a connector for connection to the boat service battery and/or a rechargeable battery (not shown) and a wireless communication device 14.

The infrared LEDs are arranged to transmit in short pulses infrared light in the direction of the wool thread 6 moving in the air flow, and the infrared photodiodes are arranged to detect reflected radiation from the wool thread 6. Signals from the photodiodes are analysed for determining if the wool thread 6 is fluttering. If it is determined that the wool thread 6 is fluttering, then a signal is communicated through the wireless communication devices 11, 14 to the signalling device 5, which can send an alarm sound and indicate on the display 13 which base module 4 has sent the alarm.

The sensor processor 10 is arranged to track which of the photodiodes last detected a reflected signal, and to switch off photodiodes that are not neighbours of said photodiode or photodiodes. The signalling device 5 also comprises a switch (not shown) for communicating a signal to the wireless communication device 11 on the base module 4 for putting base modules 4 in sleep mode. In the sleep mode the base module 4 is shortly fully powered with predetermined intervals of for instance two seconds.

The wireless communication device 11 on the base modules 4 comprise means for obtaining a unique node address from the wireless communication device 14 on the signalling device 5. The system is arranged such that when the first base module 4 of the system is taken out of its protective aluminium foil packaging, which enables radio communication to the signalling device 5, it will obtain node address 1. Each following base module 4 which is taken out of its packaging will obtain a subsequent node address (2, 3 and so on). Every time a node address is assigned to a base module 4, the signalling device 5 will show to the user a representative of the node address which he can easily remember, such as "jib top left", which the user can write down on a sticker on the base module 4. He then can attach the base module 4 on the appropriate location to the sail 2, 3, such that he or she immediately knows where turbulence is detected.

The system is further arranged to output audio signals only when there is a change in the status of the signal received from a base module 4 and it will not send audio signals more frequently than predetermined time intervals, for instance twenty seconds.

Although the invention is exemplified by one embodiment thereof, the scope of the current teaching is not restricted to said embodiment. The skilled person will appreciate that many modifications can be made and that equivalent features may substitute the described features without departing from the teachings of the invention.

The invention claimed is:

1. A system for detection of turbulent air flow across a sail of a sailboat, comprising:
   at least one base module arranged to be attached to said sail;
   an elongate body arranged to move in said air flow, which is attached to said at least one base module at one end;
   a power source on said at least one base module;
   at least one sensor on said at least one base module arranged to detect movement of said elongate body; and
   a signalling device arranged to output signals to a sailor on said sailboat in response to signals received from said at least one sensor;
   characterized in that said base module comprises at least one radiator which is arranged to transmit electromagnetic or optical radiation in the direction of said elongate body moving in said air flow; and
   said at least one sensor on said base module is arranged to detect reflected radiation from said elongate body moving in said air flow.

2. The system of claim 1, wherein said elongate body is a string or a flexible thread, preferably a wool thread.

3. The system of claim 1, wherein said at least one radiator is an infrared radiator, preferably an infrared LED, and said at least one sensor is an infrared sensor, preferably an infrared sensitive photodiode.

4. The system of claim 1 wherein said at least one radiator is a pulsating radiator.

5. The system of claim 1 wherein the power source comprises solar cells.

6. The system of claim 1 wherein said at least one base module and said signalling device each comprise wireless communication devices for communicating signals from said at least one sensor to said signalling device.

7. The system of claim 6, wherein said wireless communication device on said at least one base module comprises means for automatically obtaining a unique node address from said wireless communication device on said signalling device.

8. The system of claim 1 wherein said signalling device is arranged to output audio and/or visual signals, preferably said signalling device comprises an LCD display.

9. The system of claim 6, wherein said signalling device comprises a switch for communicating a signal to said wireless communication device on said base module for putting said base module in sleep mode, and said base module is arranged to receive said sleep mode signal and to turn into a state in reaction thereto wherein the base module is shortly fully powered with predetermined intervals, and wait for a signal to turn into a state wherein the base module is fully powered continuously.

10. The system of claim 8, wherein said system is arranged to output audio and/or visual signals only when there is a predetermined change in the signal received from said sensor and/or with predetermined time intervals.

11. The system of claim 1 wherein said system is arranged to track which of the sensors last detected a reflected signal, and to switch off sensors that are not neighbours of said sensor or sensors.

12. The system of claim 1 wherein the sides of the base module are sloping.

13. The system of claim 1 wherein said at least one base module comprises a straight or curved array of pairs of said radiators and said sensors, said array being arranged such that said base module can be attached to a sail in such a manner that said array extends substantially vertically and said elongated body is attached to the base module in front of said array.

14. The system of claim 1 wherein said system comprises a multitude of said base modules.

* * * * *